United States Patent [19]
Roche

[11] Patent Number: 5,062,507
[45] Date of Patent: Nov. 5, 1991

[54] VIBRATION AND SHOCK ABSORBER DEVICE

[75] Inventor: André Roche, Elancourt, France

[73] Assignee: Vibrachoc, Evry Cedex, France

[21] Appl. No.: 396,186

[22] Filed: Aug. 18, 1989

[30] Foreign Application Priority Data

Sep. 5, 1988 [FR] France .............................. 88 11584

[51] Int. Cl.$^5$ .............................................. F16F 7/00
[52] U.S. Cl. .................... 188/378; 248/570; 267/33; 267/152; 267/153; 267/148
[58] Field of Search ............... 267/148, 149, 33, 152, 267/140.4, 136, 286, 164, 153, 160, 158, 169, 289; 248/570, 624, 638, 636; 57/221; 184/15.1; 188/378, 379, 380

[56] References Cited

U.S. PATENT DOCUMENTS

| | | | |
|---|---|---|---|
| 3,031,163 | 4/1962 | Kerley, Jr. | 248/570 |
| 3,039,725 | 6/1962 | Kerley, Jr. | 248/570 |
| 3,044,759 | 7/1962 | Kerley, Jr. | 248/570 X |
| 3,057,593 | 10/1962 | Kerley, Jr. | 248/570 |
| 3,065,959 | 11/1962 | Kerley, Jr. et al. | 248/570 X |
| 3,086,600 | 4/1963 | Kerley, Jr. | 248/570 X |
| 3,239,207 | 3/1966 | Camossi | 248/570 X |
| 4,066,147 | 1/1978 | Toyomoto | 184/15.1 |
| 4,397,069 | 8/1983 | Camossi . | |
| 4,586,689 | 5/1986 | Lantero | 248/570 |
| 4,783,038 | 11/1988 | Gilbert et al. | 267/148 X |
| 4,854,556 | 8/1989 | Pietrzak | 267/148 X |

FOREIGN PATENT DOCUMENTS

| | | |
|---|---|---|
| 0358146 | 3/1990 | European Pat. Off. ............ 248/570 |
| 1878231 | 6/1963 | Fed. Rep. of Germany . |
| 3446831 | 4/1986 | Fed. Rep. of Germany . |
| 2281977 | 3/1976 | France . |
| 245908 | 9/1981 | France . |
| 2509000 | 1/1983 | France . |
| 2603959 | 3/1988 | France . |
| WO88/08933 | 11/1988 | PCT Int'l Appl. . |
| 853878 | 11/1960 | United Kingdom . |
| 1524721 | 9/1978 | United Kingdom . |

*Primary Examiner*—Douglas C. Butler
*Attorney, Agent, or Firm*—Sughrue, Mion, Zinn, Macpeak & Seas

[57] ABSTRACT

A vibration and shock absorber device, comprising a metal body constituted by one or more helically wound lengths of cable (1) and two bars (10, 20) interconnecting the turns in two diametrically opposite zones, with a layer of elastomer material (30) coating the structure and leaving a central orifice (31, 32, 33, 34). The turns of the lengths of cable (1) are greased or otherwise treated to prevent them from adhering to the elastomer material (30).

8 Claims, 3 Drawing Sheets

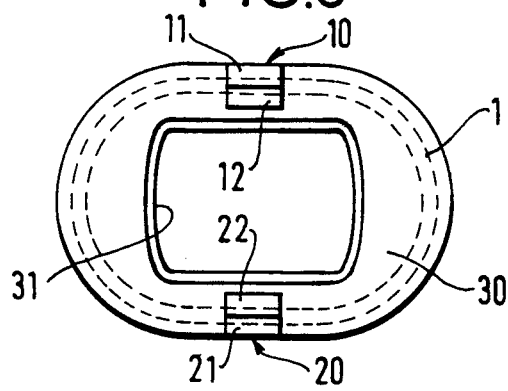
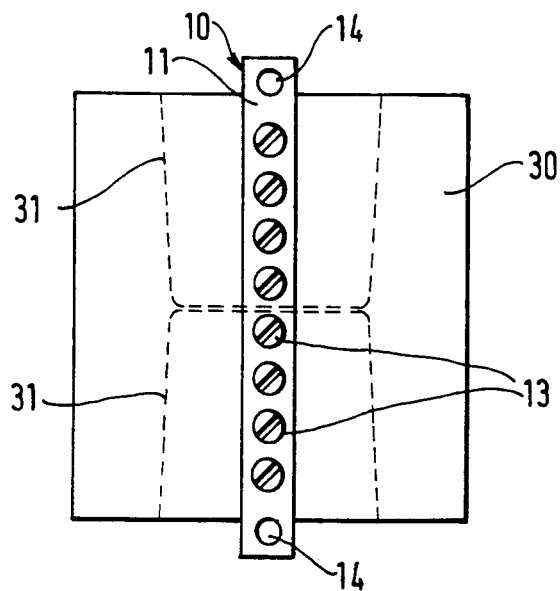
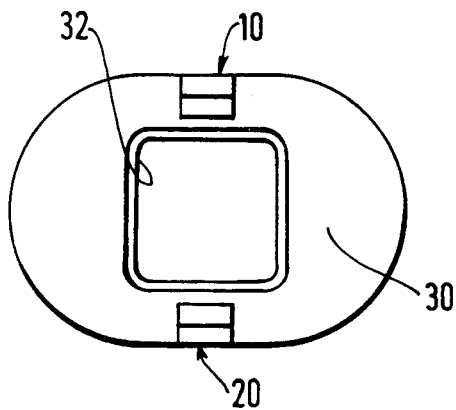
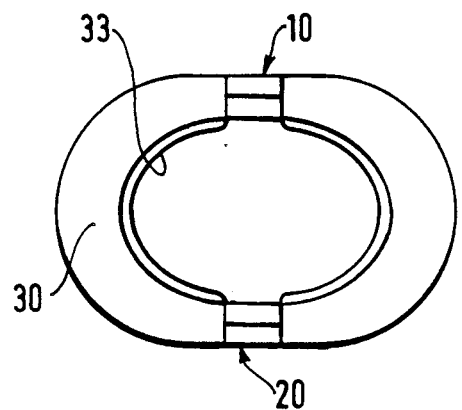

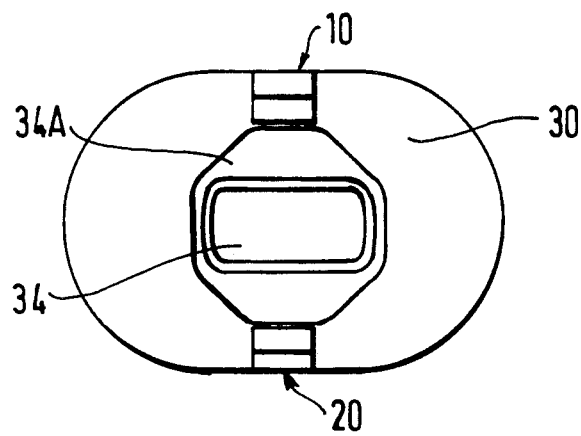
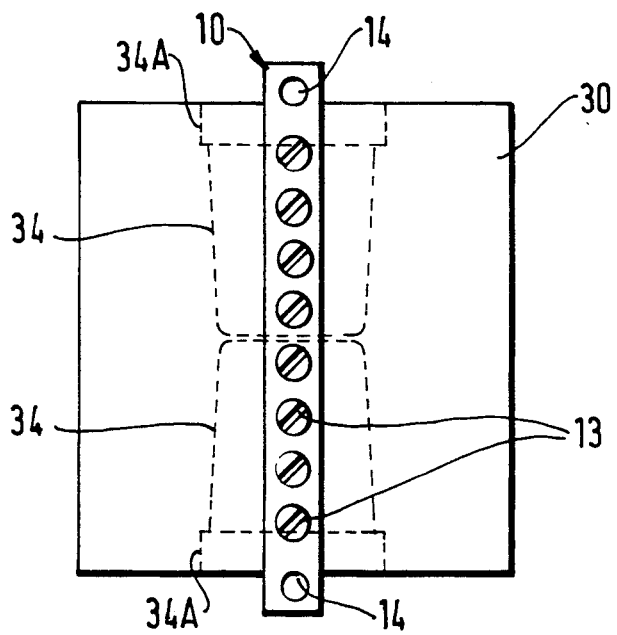
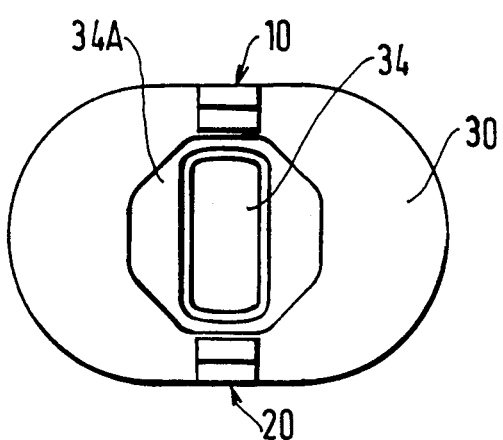 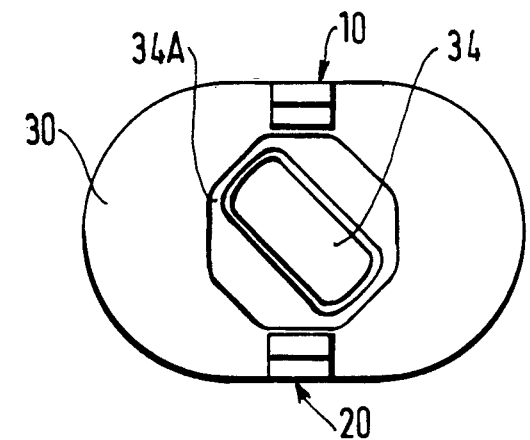

VIBRATION AND SHOCK ABSORBER DEVICE

The present invention relates to a vibration and shock absorber device, comprising a metal body constituted by one or more lengths of helically-wound cable and two bars interconnecting the turns in diametrically opposite zones.

BACKGROUND OF THE INVENTION

Such a device is mainly used for providing suspension between two structures, with the two bars then serving as fixing means enabling the absorber device to be interposed between the two structures.

Such an absorber device is described in French patent specification FR-2 459 088.

That absorber device is satisfactory with respect to absorbing shocks from any direction, since the admissible deflections are large, but its capacity for absorbing vibration is obtained solely friction between the strands of the cable (dry friction) and is insufficient.

French patent document FR-2 603 959 describes an improvement which consists in coating the absorber device with an elastomer material by hot polymerization or vulcanization while leaving a central orifice, and in treating the metal body (lengths of cable and bars) so that they adhere to the elastomer material.

Although dry friction absorption is lost, the absorber device obtained in this way absorbs vibration well by virtue of the elastomer material, however it absorbs shock less well because inter-turn deflections are limited due to the fact that the elastomer material adheres to the turns.

The object of the present invention is to absorb both shock and vibration properly, with vibration being absorbed by the presence of an elastomer material and with shocks being absorbed by virtue of the fact that the elastomer material adheres only to the bars and does not adhere to the turns of cable, thereby enabling large deflections to take place and improving lifetime.

SUMMARY OF THE INVENTION

The present invention provides a vibration and shock absorber device, comprising a metal body constituted by one or more helically wound lengths of cable and two bars interconnecting the turns in two diametrically opposite zones, with a layer of elastomer material coating the structure and leaving a central orifice, wherein the turns of the lengths of cable are greased or treated to prevent them from adherring to the elastomer material.

The elastomer material is preferably a visco-elastic material as sold under the trademark "VIBTENE" by the firm Vibrachoc.

The turns may be treated by depositing a silicone substance, or by depositing a visco-elastic material which is liquid, viscous, or solid, or by coating by means of a visco-elastic tube which is either empty or filled with a visco-elastic substance.

In order to match absorption to required performance, central orifices may be formed of various shapes and sizes, and a given orifice can be oriented in various different directions.

BRIEF DESCRIPTION OF THE DRAWINGS

Embodiments of the invention are described by way of example with reference to the accompanying drawings, in which:

FIGS. 3, 5, and 6 show three different shapes for the central orifice and FIG. 4 is a plan view of FIG. 3; and FIGS. 7, 9, and 10 show a fourth shape of orifice in three different orientations, with FIG. 8 being a plan view of FIG. 7.

DETAILED DESCRIPTION

Figure 1:
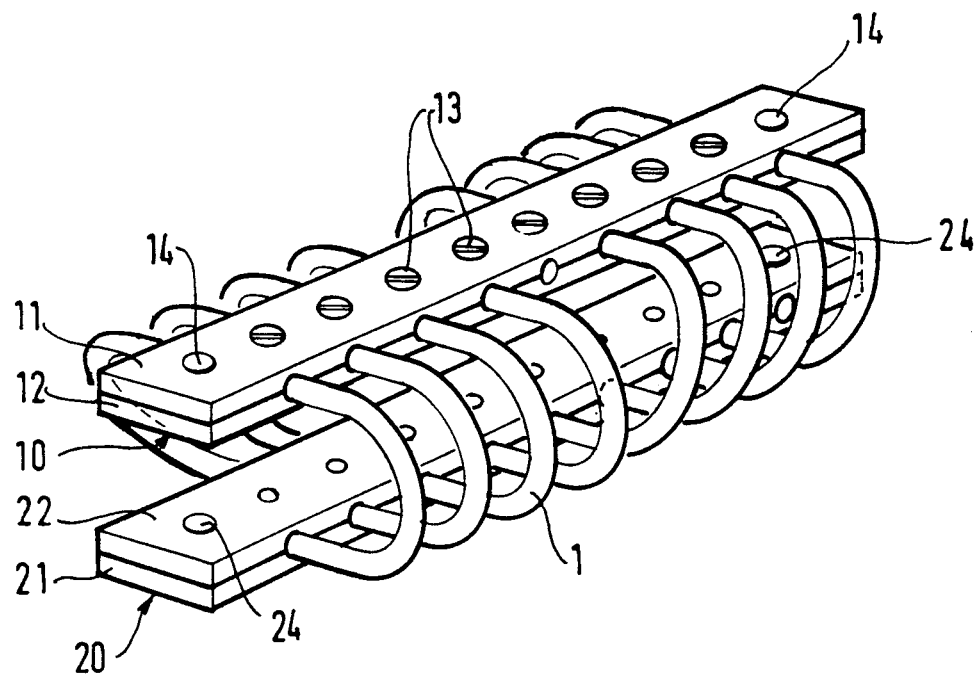
FIG. 1 is a perspective view of the metal body of an absorber device.
Figure 2:
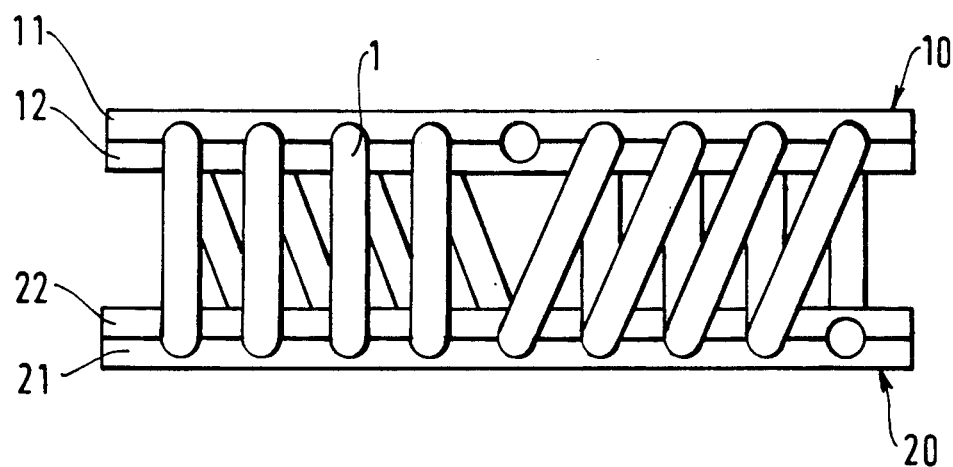
FIG. 2 is a side view of FIG. 1.

In FIG. 1, the metal body is constituted by to two bars 10 and 20 together with a single cable 1 which is wound in a manner that is more clearly visible in FIG. 2.

The bar 10 comprises two half-bars 11 and 12 with each half-bar having semi-cylindrical notches for retaining respective turns of the cable. The two half-bars 11 and 12 are interconnected by screws 13. The two ends of the bar 10 have respective orifices 14 for fixing to a structure requiring vibration and shock absorption.

The bar 20 also comprises two half-bars 21 and 22 interconnected by screws 23 (not shown) and having two respective end orifices 24 for fixing to the other structure requiring vibration and shock absorption.

FIG. 3 shows a device comprising a cable 1 and two bars 10 and 20 coated in a visco-elastic material 30, having a central orifice 31 which is substantially rectangular in section.

FIG. 4 is a plan view of FIG. 3 showing that the coating 30 coats the cable completely right up to the vicinity of each fixing orifice 14. It also shows the special shape of the orifice 31 in the longitudinal direction, which shape is in the form of two frustoconical portions to facilitate unmolding.

FIG. 5 shows a central orifice 32 which is essentially square in section, and FIG. 6 shows a central orifice 33 which is substantially oval in section.

FIGS. 7, 9, and 10 all show central orifice 34 having a cross-section which is approximately rectangular. However, unlike the orifices 31, 32, and 33 of FIGS. 3, 5, and 6, each end of the orifice 34 includes a facing 34A which is substantially octagonal in section and which extends over a depth which can be seen in FIG. 8. The facing facilitates the mounting of the screws or bolts engaged in the fixing orifices 14 and 24.

The different orientations of the central orifice also serve to adapt the absorber to the performance required thereof.

In particular, the orientation inclined at 45° as visible in FIG. 10 serves to adapt stiffness along two orthogonal axes.

FIGS. 4 and 8 show that the orifices 31 and 34 leave a narrow central partition between each other, but this partition could easily be removed after unmolding. Alternatively, the partition could be thicker in which case the thickness of the partition should be determined as a function of the desired stiffness.

I claim:

1. In a vibration and shock absorber device, comprising a metal body constituted by at least one helically wound length of cable of plural turns and two bars interconnecting the turns in two diametrically opposite zones, and a layer of elastomer material coating the structure and leaving a central orifice, the improvement comprising said turns of said length of cable comprising means for preventing said turns from adhering to the elastomer material.

2. A device according to claim 1, wherein the adhering preventing means comprises a deposit of a visco-elastic material on said turns.

3. A device according to claim 1, wherein the central orifice is of oval shape.

4. A device according to claim 1, wherein the orientation of the orifice is oblique to a plane including said two bars.

5. A device according to claim 1, wherein each end of the central orifice has a facing which is octagonal in shape.

6. The device according to claim 1, wherein said adhering preventing means comprises a deposit of a silicone substance on said turns.

7. The device according to claim 1, wherein said means for preventing said turns from adhering to the elastomer material comprises a visco-elastic tube about said turns of the length of cable.

8. The device according to claim 7, wherein said visco-elastic tube is filled with a visco-elastic substance.

* * * * *